United States Patent [19]

Kleiner et al.

[11] Patent Number: 5,773,556
[45] Date of Patent: Jun. 30, 1998

[54] LOW-FLAMMABILITY POLYAMIDE MOLDING MATERIALS

[75] Inventors: Hans-Jerg Kleiner, Kronberg; Winfried Budzinsky; Günther Kirsch, both of Bad Soden, all of Germany

[73] Assignee: Ticona GmbH, Germany

[21] Appl. No.: 806,479

[22] Filed: Feb. 27, 1997

[30] Foreign Application Priority Data

Feb. 29, 1996 [DE] Germany ............... 196 07 635.8

[51] Int. Cl.[6] ............ C08G 69/42; C08G 79/02; C08K 5/53

[52] U.S. Cl. ............ 528/321; 528/310; 528/332; 528/335; 528/337; 524/126; 524/133; 524/135; 524/139; 524/147; 524/417; 524/600; 524/606; 525/419; 525/420

[58] Field of Search ............ 528/310, 332, 528/335, 321, 337; 524/600, 606, 126, 133, 135, 139, 147, 417; 525/419, 420

[56] References Cited

U.S. PATENT DOCUMENTS

| | | | |
|---|---|---|---|
| 3,594,347 | 7/1971 | Lazarus et al. | 524/135 |
| 3,900,444 | 8/1975 | Racky et al. | 524/605 |
| 3,953,539 | 4/1976 | Kawase et al. | 524/116 |
| 4,036,811 | 7/1977 | Noetzel et al. | 524/600 |
| 4,049,612 | 9/1977 | Sandler et al. | 524/126 |
| 4,078,016 | 3/1978 | Kramer et al. | 525/389 |
| 4,180,495 | 12/1979 | Sandler et al. | 524/135 |
| 4,208,321 | 6/1980 | Sandler | 524/600 |
| 4,208,322 | 6/1980 | Sandler et al. | 525/434 |

FOREIGN PATENT DOCUMENTS

| | | |
|---|---|---|
| 0 006 568 | 1/1980 | European Pat. Off. . |
| 2 204 659 | 5/1974 | France . |
| 2 422 698 | 11/1979 | France . |
| 2 102 841 | 8/1971 | Germany . |
| 24 47 727 | 4/1976 | Germany . |
| 2 827 867 | 1/1980 | Germany . |
| 28 27 867 | 1/1980 | Germany . |
| 51-047035 | 4/1976 | Japan . |

OTHER PUBLICATIONS

B.P. Block, "Polymeric Metal Phosphinates", Inorg. Macromol. Rev., 1 (1970) pp. 115–125 the month in the date of the publicaton is not available.

Chemical Abstracts, vol. 85 No. 10 Sep. 26, 1976 Abstract No. 64058.

*Primary Examiner*—P. Hampton-Hightower
*Attorney, Agent, or Firm*—Connolly & Hutz

[57] ABSTRACT

Low-flammability polyamide molding materials are obtained by admixing calcium or aluminum phosphinates. These salts confer improved flame protection on polyamides compared with other metal salts.

13 Claims, No Drawings

LOW-FLAMMABILITY POLYAMIDE MOLDING MATERIALS

BACKGROUND OF THE INVENTION

1. Field of the Invention

The invention relates to low-flammability polyamide molding materials comprising calcium or aluminum phosphinates.

2. Description of the Related Art

Polymers are frequently rendered flame-resistive by adding phosphorus and halogen compounds to them. Some polymers are processed at high temperatures, for example at 250° C. or higher. For this reason, many known flame retardants are unsuitable for polymers, since they are too volatile or decompose at these high temperatures. Alkali metal salts of phosphinic acids are thermally stable and have already been proposed for use as flame-retardant additions to polyamide molding materials (DE-A1-2 447 727). However, they tend to corrosion effects. Similarly, the zinc salts used are not fully satisfactory as regards their flame-retardant effect. Low-flammability polyamides can also be produced by using phosphinic acid salts in concert with nitrogen bases such as melamine, dicyandiamide or guanidine (DE-A1-28 27 867). Polymeric metal phosphinates are a further large class of phosphinic acid salts. They are nonionic coordination complexes and are soluble in organic solvents. They can also be used as flame retardants for polyamides (U.S. Pat. No. 4,208,321). The disadvantage is the generally difficult industrial production of these metal phosphinate polymers.

SUMMARY OF THE INVENTION

It has now been found that, surprisingly, calcium and aluminum salts of phosphinic or diphosphinic acids exhibit excellent flame retardancy in polyamide plastics, whereas other metal salts of the same phosphinic or diphosphinic acids exhibit only inadequate flame retardancy.

The invention is drawn to a molding composition comprising a polyamide and a phosphoric acid salt of the formula (I) and/or a disphosphoric acid salt of the formula (II)

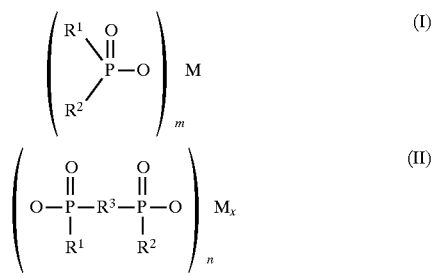

where $R^1$ and $R^2$ are identical or different and are $C_1$–$C_{16}$-alkyl, $R^3$ is $C_1$–$C_{10}$-alkylene, linear or branched, arylene, alkylarylene, arlalkylene, M is a calcium or aluminum ion;

m is 2 or 3;

n is 1 or 3;

x is 1 or 2.

This invention accordingly provides a molding material comprising a polyamide and a phosphinic or diphosphinic acid salt of the metals calcium or aluminum.

This invention further provides a molding material comprising a polyamide and a phosphinic acid salt of the formula (I) and/or a diphosphinic acid salt of the formula (II)

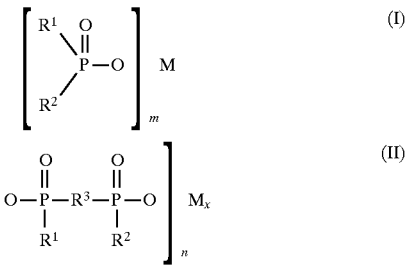

where $R^1$ and $R^2$ are each $C_1$–$Cl_{16}$-alkyl, preferably $C_1$–$C_8$-alkyl, linear or branched, for example methyl, ethyl, n-propyl, isopropyl, n-butyl, tert-butyl, n-pentyl, n-octyl, phenyl;

$R^3$ is $C_1$–$C_{10}$-alkylene, linear or branched, for example methylene, ethylene, n-propylene, isopropylene, n-butylene, tert-butylene, n-pentylene, n-octylene, n-dodecylene;

arylene, for example phenylene, naphthylene;

alkylarylene, for example methylphenylene, ethylphenylene, tert-butylphenylene, methylnaphthylene, ethylnaphthylene, tert-butylnaphthylene;

arylalkylene, for example phenylmethylene, phenylethylene, phenylpropylene, phenylbutylene;

M is a calcium or aluminum ion;

m is 2 or 3;

n is 1 or 3;

x is 1 or 2 and/or polymers thereof.

Polyamides are polymers that contain recurring amide groups as integral parts of the polymer chain. Polyamides which can be used for the purposes of this invention are described for example in "Ullmann's Encyclopedia of Industrial Chemistry, ed. Barbara Elvers, Vol. A21, chapter 'Polyamides' (p. 179–205), VCH, Weinheim-Basel-Cambridge-New York 1992", incorporated herein by reference. Particularly suitable polyamides are nylon 6 and nylon 66. Polyamides and polyamide compounds are referred to hereinafter as polymers.

In what follows, the term "phosphinic acid salt" designates calcium and aluminum salts of the phosphinic and diphosphinic acids and polymers thereof.

The phosphinic acid salts of this invention, which are prepared in an aqueous medium, are essentially monomeric compounds. Depending on the reaction conditions, polymeric phosphinic acid salts can also be formed in certain circumstances.

Suitable phosphinic acids for forming part of the phosphinic acid salts of this invention are for example:

isobutylmethylphosphinic acid, octylmethylphosphinic acid, dimethylphosphinic acid, ethylmethylphosphinic acid, diethylphosphinic acid, methyl-n-propylphosphinic acid, methane-1,2-di(methylphosphinic acid), ethane-1,2-(dimethylphosphinic acid), hexane-1,6-di(methylphosphinic acid), benzene-1,4-(dimethylphosphinic acid), methylphenylphosphinic acid, diphenylphosphinic acid.

The phosphinic acid salts can be prepared by known methods, by reacting the phosphinic acids with metal carbonates, metal hydroxides or metal oxides of the metals in question in aqueous solution.

The amount of phosphinic acid salt added to the polymers can vary within wide limits. In general, 5 to 35% by weight, based on the polymer, preferably 10 to 25% by weight, in particular 15 to 20% by weight, of the phosphinic acid salt is used. The most suitable amount of phosphinic acid salt depends on the nature of the polymer and the nature of the phosphinic acid salt used and can be readily ascertained by experimentation.

The phosphinic acid salts can be used in various physical forms, depending on the nature of the polymer used and the desired properties. For instance, the phosphinic acid salts can be ground to a finely divided form, for example for achieving a better dispersion in the polymer. If desired, it is also possible to use mixtures of various phosphinic acid salts.

The phosphinic acid salts are thermally stable, do not decompose the polymers during processing and do not affect the process of producing the polyamide molding material. The phosphinic acid salts are not volatile under production and processing conditions for polymers.

The phosphinic acid salt can be incorporated into the polymer by mixing the two and then melting the polymer in a compounder (a twin-screw extruder, for example) and homogenizing the phosphinic acid salt in the polymer melt. The melt can be extruded, cooled and granulated. The phosphinic acid salt can also be metered directly into the compounder.

It is similarly possible to mix the flame retardants into a finished granular polyamide and process the mixture direct on an injection molding machine or first to melt the mixture in an extruder, granulate and process after drying.

The phosphinic acid salts can also be added during the polyamide production process.

As well as the phosphinic acid salts, the polymer may also have added to it fillers and reinforcing materials such as glass fibers, glass balls or minerals such as chalk. In addition, the products may comprise other additives such as stabilizers, lubricants, colorants, fillers, nucleating agents or antistats.

Particular preference is given to molding materials comprising polyamide, phosphinic or diphosphinic acid salts or the metals calcium or aluminum, and glass fiber. Glass fiber reinforced molding materials according to this invention exhibit particularly favorable flame-retardant properties.

Polyamides comprising phosphinic acid salts are useful for example for manufacturing flame-resistive technical components particularly for manufacturing construction components of electrical equipment, mechanical transmission parts in machines and structural components in large computers.

It has now been found that polyamide molding materials which have been rendered low-flammable with calcium and aluminum phosphinates have a higher tracking current resistance (comparative tracking index CTI). The polyamide molding materials are advantageously useful in the following applications: electrical components, such as coil formers, transformers, relays, switches, plug connectors, motors and motor parts (rotors, bearing plates, etc.); molded interconnection devices (MIDs), bases (e.g. SIMM bases); mechanical components in electrical and household appliances, for example gearwheels, levers, camshafts, spacers, hinges, sliding bearings; housings, coverings and sheathings or coatings of electrical components and equipment, for example capacitor housings, relay housings, capacitor covers, cable sheathings; shaped articles.

These application examples are preferably manufactured by injection molding, but in some instances they can also be fabricated by extrusion or press molding.

As well as the flame-retardant components, the polyamide molding materials can also comprise fillers and reinforcing materials, such as glass fibers, glass balls, glass flakes, minerals such as talc, mica, wollastonite, chalk, carbon black, dyes, stabilizers, lubricants and demolding aids, plasticizers and other customary additives.

EXAMPLES

1. Preparation of phosphinic acid salts 1.1 Preparation of the calcium salt of ethylmethylphosphinic acid 1630 g (15.1 mol) of ethylmethylphosphinic acid are dissolved in 3 l of water, and 422.8 g (7.55 mol) of calcium oxide (unslaked lime) are added over 1.5 hours a little at a time with vigorous stirring, and the temperature rises to 75° C. Further calcium oxide is then added until a pH electrode introduced into the solution indicates pH=7. A little active charcoal is then added, the mixture is stirred for 1.5 hours under reflux and then filtered. The filtrate is evaporated to dryness and dried at 120° C. in a vacuum drying cabinet to constant weight. This affords 1920 g of a white powder which has no melting point below 300° C. Yield: 100% of theory.

1.2 Preparation of the aluminum salt of ethylmethylphosphinic acid 2106 g (19.5 mol) of ethylmethylphosphinic acid are dissolved in 6.5 l of water, and 507 g (6.5 mol) of aluminum hydroxide are added with vigorous stirring while heating to 850° C. In total, the mixture is stirred at 80°–90° C. for 65 hours, then cooled down to 60° C. and filtered with suction. Drying to constant weight at 120° C. in a vacuum drying cabinet leaves 2140 g of a finely granular powder which has no melting point below 300° C. Yield: 95% of theory.

1.3 Preparation of the calcium salt of ethane-1,2-bismethylphosphinic acid 325.5 g (1.75 mol) of ethane-1,2-bismethylphosphinic acid are dissolved in 500 ml of water, and 129.5 g (1,75 mol) of calcium hydroxide are added over one hour a little at a time with vigorous stirring. The mixture is then stirred at 90° to 95° C. for some hours, cooled and filtered with suction. Drying at 150° C. in a drying cabinet leaves 335 g of a product which has no melting point below 380° C. Yield: 85% of theory.

1.4 Preparation of the aluminum salt of ethane-1,2-bismethylphosphinic acid 334.8 g (1.8 mol) of ethane-1,2-bismethylphosphinic acid are dissolved in 600 ml of water, and 93.6 g (1.2 mol) of aluminum hydroxide are added over one hour a little at a time with vigorous stirring. The mixture is then refluxed for 24 hours and subsequently filtered hot with suction, and the filter residue is washed with water. Drying leaves 364 g of a white powder which has no melting point below 380° C. Yield: 100% of theory.

1.5 Preparation of the calcium salt of methylpropylphosphinic acid 366 g (3.0 mol) of methylpropylphosphinic acid are dissolved in 600 ml of water, and 84 g (1.5 mol) of calcium oxide are added a little at a time with vigorous stirring, and the temperature rises to 65° C. This temperature is then maintained until a clear solution has formed. The solution is then evaporated to dryness under reduced pressure. The residue after drying at 120° C. in a vacuum drying cabinet is 364 g. Yield: about 85% of theory.

1.6 Preparation of the aluminum salt of methylpropylphosphinic acid 115 g (0.943 mol) of methylpropylphosphinic acid are dissolved in 310 g of water, and 24.5 g (0.314 mol) of aluminum hydroxide are added. The mixture is then maintained at 98° C. with stirring for 23 hours. It is then filtered with suction and the filter residue is dried in a vacuum drying cabinet to leave 113 g of a white powder which has no melting point below 380° C. Yield: 90% of theory.

1.7 Preparation of the aluminum salt of methyloctylphosphinic acid 115.2 g (0.6 mol) of methyloctylphosphinic acid are heated to 60° C. with 250 ml of water. 15.6 g (0.2 mol) of aluminum hydroxide are then added, and the mixture is heated to 80° C. with constant stirring. Altogether, the batch is stirred at 80° to 90° C. for 15 hours, at which point it is filtered with suction. Drying leaves 115 g of a white powder which has no melting point below 360° C. Yield: 96% of theory.

2. Production and testing of flame-retardant polyamide

The phosphorus compounds were mixed with the polymer and incorporated on a commercially available twin-screw compounder. In the case of glass fiber reinforced products, commercially available glass fibers were metered into the polyamide melt. The melt temperature during the compounding was about 265° C.

The test specimens were produced on an injection molding machine to ISO 7792-2.

Test specimens of each mixture were used to determine the UL, 94 (Underwriters Laboratories) fire resistance classification on test specimens 1.6 mm and 1.2 mm in thickness.

The criteria conditions for the UL 94 classifications are as follows:

V-0 no afterflame time longer than 10 seconds, total afterflame time for 10 flame applications not greater than 50 seconds, no flaming drops, no afterflame of any specimen up to the holding clamp, no afterglow of the specimens for longer than 30 seconds after flame application V-1 no afterflame time longer than 30 seconds after flame application, total afterflame time for 10 flame applications not greater than 250 seconds, no afterglow of samples for longer than 60 seconds after flame application, other criteria as for V-0

V-2 cotton indicator ignited by flaming drops, other criteria as for V-1

<V-2 does not meet the criteria of materials classification V-2.

Nylon 66 and 30% by weight each of the calcium salt or the aluminum salt of ethylmethylphosphinic acid were used to produce compounds reinforced with 30% by weight of glass fibers without any further additions such as processing stabilizers, the compounds were used for injection molding test,specimens, and these test specimens were subjected to the UL 94 fire test.

For comparison, a compound including the same concentrations of the zinc salt of ethylmethylphosphinic acid and glass fibers was tested as well.

The results are shown in the following table:

| Salt of ethylmethylphosphinicacid | UL 94 materials classification | |
|---|---|---|
| | Specimen thickness 1.6 mm | Specimen thickness 1.2 mm |
| Zinc salt | V-2 | <V-2 |
| Calcium salt | V-0 | V-0 |
| Aluminum salt | V-0 | V-0 |

The table clearly shows the improved flame retardancy of the calcium or aluminum salt of ethylmethylphosphinic acid compared with that of the zinc salt of ethylmethylphosphinic acid.

We claim:

1. A molding composition comprising a polyamide and a phosphinic acid salt of the formula (I) and/or a diphosphinic acid salt of the formula (II)

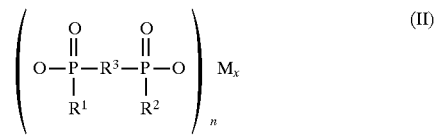

where
$R^1$ and $R^2$ are identical or different and are $C_1$–$C_{16}$-alkyl,
$R^3$ is $C_1$–$C_{10}$-alkylene, linear or branched, arylene, alkylarylene or arylalkylene,
M is a calcium or aluminum ion;
m is 2 or 3;
n is 1 or 3;
x is 1 or 2.

2. The molding composition according to claim 1, comprising the polyamides nylon 46 or nylon 66.

3. The molding composition according to claim 1, comprising 5 to 35% by weight of the phosphinic or diphosphinic acid salt.

4. The molding composition according to claim 1, comprising 10 to 25% by weight of is the phosphinic or diphosphinic acid salt.

5. The molding composition according to claim 1, comprising 15 to 20% by weight of the phosphinic or diphosphinic acid salt.

6. The molding composition according to claim 1, comprising glass fiber.

7. The molding composition as claimed in claim 1, wherein
$R^1$ and $R^2$ are identical or different and are $C_1$–$C_8$-alkyl,
$R^3$ is selected from the group consisting of methylene, ethylene, n-propylene, isopropylene, n-butylene, tert-butylene, n-pentylene, n-octylene, n-dodecylene, phenylene, naphthylene, methylphenylene, ethylphenylene, tert-butylphenylene, methylnaphthylene, ethylnaphthylene, tert-butylnaphthylene, phenylmethylene, phenylethylene, phenylpropylene and phenylbutylene.

8. The molding composition as claimed in claim 1, wherein $R^1$ and $R^2$ are identical or different and are a $C_1$–$C_4$-alkyl.

9. The molding composition as claimed in claim 1, wherein the phosphinic acid salt of formula (I) is present and $R^1$ and $R^2$ are identical or different are $C_1$–$C_3$-alkyl.

10. The molding composition as claimed in claim 8, wherein said diphosphinic acid salt of the formula (II) is used.

11. A flame retardant which comprises the molding composition according to claim 1.

12. An article comprising the molding composition as claimed in claim 1.

13. The article comprising the molding composition as claimed in claim 12, wherein said article is an electrical component, plug part, mechanical component, molding, housing, covering, sheathing or coating.

* * * * *